US011073085B2

(12) United States Patent
Staubach et al.

(10) Patent No.: US 11,073,085 B2
(45) Date of Patent: Jul. 27, 2021

(54) INTERCOOLED COOLING AIR HEAT EXCHANGER ARRANGEMENT

(71) Applicant: United Technologies Corporation, Farmington, CT (US)

(72) Inventors: Joseph B. Staubach, Colchester, CT (US); Nathan Snape, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 422 days.

(21) Appl. No.: 15/346,169

(22) Filed: Nov. 8, 2016

(65) Prior Publication Data

US 2018/0128179 A1    May 10, 2018

(51) Int. Cl.
*F02C 7/18*    (2006.01)
*F02C 3/04*    (2006.01)
(Continued)

(52) U.S. Cl.
CPC .............. *F02C 7/185* (2013.01); *F02C 3/04* (2013.01); *F02C 9/18* (2013.01); *F02K 3/077* (2013.01);
(Continued)

(58) Field of Classification Search
CPC ...... F02C 3/04; F02C 9/18; F02C 9/52; F02C 6/08; F02C 7/141; F02C 7/143;
(Continued)

(56) References Cited

U.S. PATENT DOCUMENTS 4,991,394 A * 2/1991 Wright .................... F02C 7/185
60/226.1
5,185,997 A * 2/1993 Nishijima ............... F02C 7/185
60/740
(Continued)

FOREIGN PATENT DOCUMENTS

EP    2845804 A1    3/2015
EP    3085924 A1    10/2016

OTHER PUBLICATIONS

Xin, Meng, "Preliminary Propulsion Performance Analysis for the Commercial Supersonic Transport", International Society for Air Breathing Engines 2015, ISABE-2015-20070, Oct. 22, 2015 (Year: 2015).*

(Continued)

*Primary Examiner* — Scott J Walthour
(74) *Attorney, Agent, or Firm* — Cantor Colburn LLP (57) ABSTRACT

An intercooled cooling system for a gas turbine engine is provided. The intercooled cooling system includes a plurality of cooling stages in fluid communication with an air stream utilized for cooling. A first cooling stage of the plurality of cooling stages is fluidly coupled to a bleed port of a compressor of the gas turbine engine to receive and cool bleed air with the air stream to produce a cool bleed air. The intercooled cooling system also includes a pump fluidly coupled to the first cooling stage to receive the cool bleed air and increase a pressure of the cool bleed air to produce a pressurized cool bleed air. A second cooling stage of the plurality of cooling stages is fluidly coupled to the pump to receive and cool the pressurized cool bleed air to produce an intercooled cooling air, which is provided to the gas turbine engine.

16 Claims, 4 Drawing Sheets

(51) Int. Cl.
*F02C 9/18* (2006.01)
*F02K 3/077* (2006.01)

(52) U.S. Cl.
CPC .... *F05D 2220/32* (2013.01); *F05D 2260/212* (2013.01); *F05D 2260/213* (2013.01); *Y02T 50/60* (2013.01)

(58) Field of Classification Search
CPC ............... F02C 7/185; F05D 2260/212; F05D 2260/213; F02K 3/077
See application file for complete search history.

(56) References Cited

U.S. PATENT DOCUMENTS

| | | | | | |
|---|---|---|---|---|---|
| 5,452,573 | A | * | 9/1995 | Glickstein | F02C 6/08 60/39.183 |
| 5,724,806 | A | * | 3/1998 | Horner | F02C 7/12 60/728 |
| 7,536,864 | B2 | * | 5/2009 | Wolfe | F01D 17/105 60/782 |
| 7,975,465 | B2 | * | 7/2011 | Morris | F02C 6/08 244/60 |
| 8,037,686 | B2 | * | 10/2011 | Lasker | F02C 1/04 60/677 |
| 9,850,819 | B2 | * | 12/2017 | Suciu | F01D 17/105 |
| 10,100,739 | B2 | * | 10/2018 | Kupratis | F02C 6/08 |
| 10,221,862 | B2 | * | 3/2019 | Suciu | F01D 25/12 |
| 10,371,055 | B2 | * | 8/2019 | Snape | F02K 3/075 |
| 10,443,508 | B2 | * | 10/2019 | Merry | F01D 17/105 |
| 2010/0107594 | A1 | * | 5/2010 | Coffinberry | F02C 6/08 60/39.093 |
| 2012/0144842 | A1 | * | 6/2012 | Snyder | F02K 3/115 60/785 |
| 2014/0250898 | A1 | * | 9/2014 | Mackin | F02C 6/08 60/772 |
| 2014/0311157 | A1 | * | 10/2014 | Laurello | F02C 6/08 60/782 |
| 2015/0354465 | A1 | * | 12/2015 | Suciu | F02C 3/04 60/782 |
| 2016/0237901 | A1 | * | 8/2016 | Zelesky | F02K 3/115 |
| 2016/0237908 | A1 | * | 8/2016 | Snape | F02C 6/08 |
| 2016/0312704 | A1 | * | 10/2016 | Suciu | F01D 17/105 |
| 2016/0312711 | A1 | * | 10/2016 | Suciu | F02C 7/143 |
| 2017/0106985 | A1 | * | 4/2017 | Stieger | B64D 13/06 |
| 2017/0159568 | A1 | * | 6/2017 | Sennoun | F04D 29/5826 |
| 2017/0184027 | A1 | * | 6/2017 | Moniz | F02C 7/14 |
| 2017/0306847 | A1 | * | 10/2017 | Suciu | F02C 3/04 |
| 2018/0080383 | A1 | | 3/2018 | Snape | |
| 2018/0128178 | A1 | * | 5/2018 | Snape | F02C 6/08 |

OTHER PUBLICATIONS

Search Report dated Mar. 21, 2018, EP Application No. 17200678.5, 9 pages.
EP Application No. 17200688.5 Office Action dated Oct. 21, 2019, 6 pages.

* cited by examiner

INTERCOOLED COOLING AIR HEAT EXCHANGER ARRANGEMENT

BACKGROUND

This present disclosure relates to a gas turbine engine, and more particularly to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

Running the operating temperatures in the turbine section at high temperatures provides efficiency gains in the gas turbine engine; however, the high temperatures are exceeding material limits and are driving the need for improved cooling air. That is, conventional cooling air methods fail to provide cooling air at sufficient pressure to be introduced to the highest pressure places of the gas turbine engine and at cool enough temperature to reduce key component temperatures.

BRIEF DESCRIPTION

In accordance with an embodiment, an intercooled cooling system for a gas turbine engine is provided. The intercooled cooling system includes a plurality of cooling stages in fluid communication with an air stream utilized for cooling. A first cooling stage of the plurality of cooling stages is fluidly coupled to a bleed port of a compressor of the gas turbine engine to receive bleed air and cool the bleed air with the air stream to produce a cool bleed air. The intercooled cooling system also includes a pump fluidly coupled to the first cooling stage to receive the cool bleed air and increase a pressure of the cool bleed air to produce a pressurized cool bleed air. A second cooling stage of the plurality of cooling stages is fluidly coupled to the pump to receive the pressurized cool bleed air and cool the pressurized cool bleed air to produce an intercooled cooling air, which is provided to the gas turbine engine.

In accordance with another embodiment or the intercooled cooling air system embodiment above, the bleed port can comprise a port at a low pressure location of the compressor.

In accordance with another embodiment or any of the intercooled cooling air system embodiments above, the bleed port can comprise a port at a mid-pressure location of the compressor.

In accordance with another embodiment or any of the intercooled cooling air system embodiments above, the cooling by the first cooling stage can offset the pressurizing by the pump.

In accordance with another embodiment or any of the intercooled cooling air system embodiments above, the pressurized cool bleed air can have a pressure greater than a pressure of the cool bleed air.

In accordance with another embodiment or any of the intercooled cooling air system embodiments above, the intercooled cooling air produced by the second cooling stage can be mixed with a second bleed air sourced from a second bleed port of the compressor.

In accordance with another embodiment or any of the intercooled cooling air system embodiments above, the second bleed port can comprise a port at a high pressure location of the compressor.

In accordance with another embodiment or any of the intercooled cooling air system embodiments above, the intercooled cooling air and the second bleed air can be mixed upstream of a turbine section of the gas turbine engine.

In accordance with another embodiment or any of the intercooled cooling air system embodiments above, the plurality of cooling stages can be configured in a main bypass of the gas turbine engine to receive the air stream.

In accordance with another embodiment or any of the intercooled cooling air system embodiments above, the plurality of cooling stages can be configured on a duct wall of a bypass duct, and the air stream can comprise a plurality of streams on either side of the duct wall.

In accordance with another embodiment or any of the intercooled cooling air system embodiments above, the pump can be configured to be powered by a gearbox utilizing a second bleed air from the compressor.

In accordance with an embodiment, a gas turbine engine is provided. The gas turbine engine includes a compressor section; a combustor section; a turbine section; and an intercooled cooling system for a gas turbine engine. The intercooled cooling system includes a plurality of cooling stages in fluid communication with an air stream utilized by the plurality of cooling stages for cooling. A first cooling stage of the plurality of cooling stages is fluidly coupled to a bleed port of a compressor of the compressor section to receive bleed air and cool the bleed air with the air stream to produce a cool bleed air. The intercooled cooling system also includes a pump fluidly coupled to the first cooling stage to receive the cool bleed air and increase a pressure of the cool bleed air to produce a pressurized cool bleed air. A second cooling stage of the plurality of cooling stages is fluidly coupled to the pump to receive the pressurized cool bleed air and cool the pressurized cool bleed air to produce an intercooled cooling air. The second cooling stage provides the intercooled cooling air to the turbine section.

In accordance with another embodiment or the gas turbine engine embodiment above, the pump can be configured to be powered by a gearbox utilizing a second bleed air from the compressor.

In accordance with an embodiment, a method of providing cooling air to a gas turbine engine is provided. The method includes cooling a bleed air flow in a first cooling stage to produce a cooled bleed air flow; passing the cooled bleed air flow to a pump; increasing a pressure of the cooled bleed air flow in the pump to produce a pressurized cooled bleed air flow; receiving the pressurized cooled bleed air flow from pump in a second cooling stage; cooling the pressurized cooled bleed air flow in the first second exchanger to produce an intercooled cooling air; and mixing the intercooled cooling air from the second cooling stage with another source of bleed air to provide the cooling air; and providing the cooling air to a gas turbine engine.

In accordance with another embodiment or the method embodiment above, the method comprises passing the bleed air flow from a compressor of the gas turbine engine to the first cooling stage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
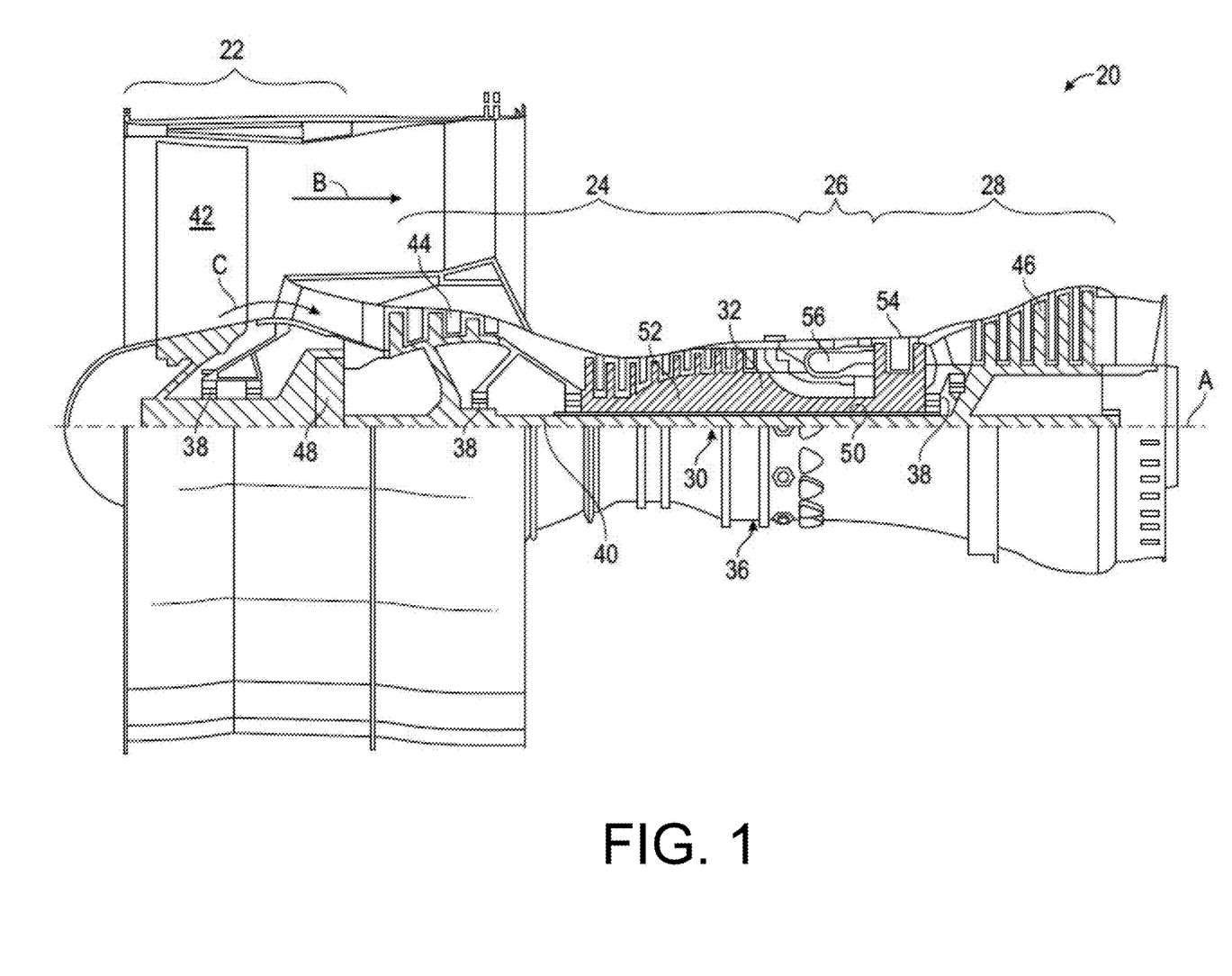
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]0.5$. The "Low corrected fan tip speed" as disclosed herein according to one non-limiting embodiment is less than about 1150 ft/second (350.5 m/sec).

Figure 2:
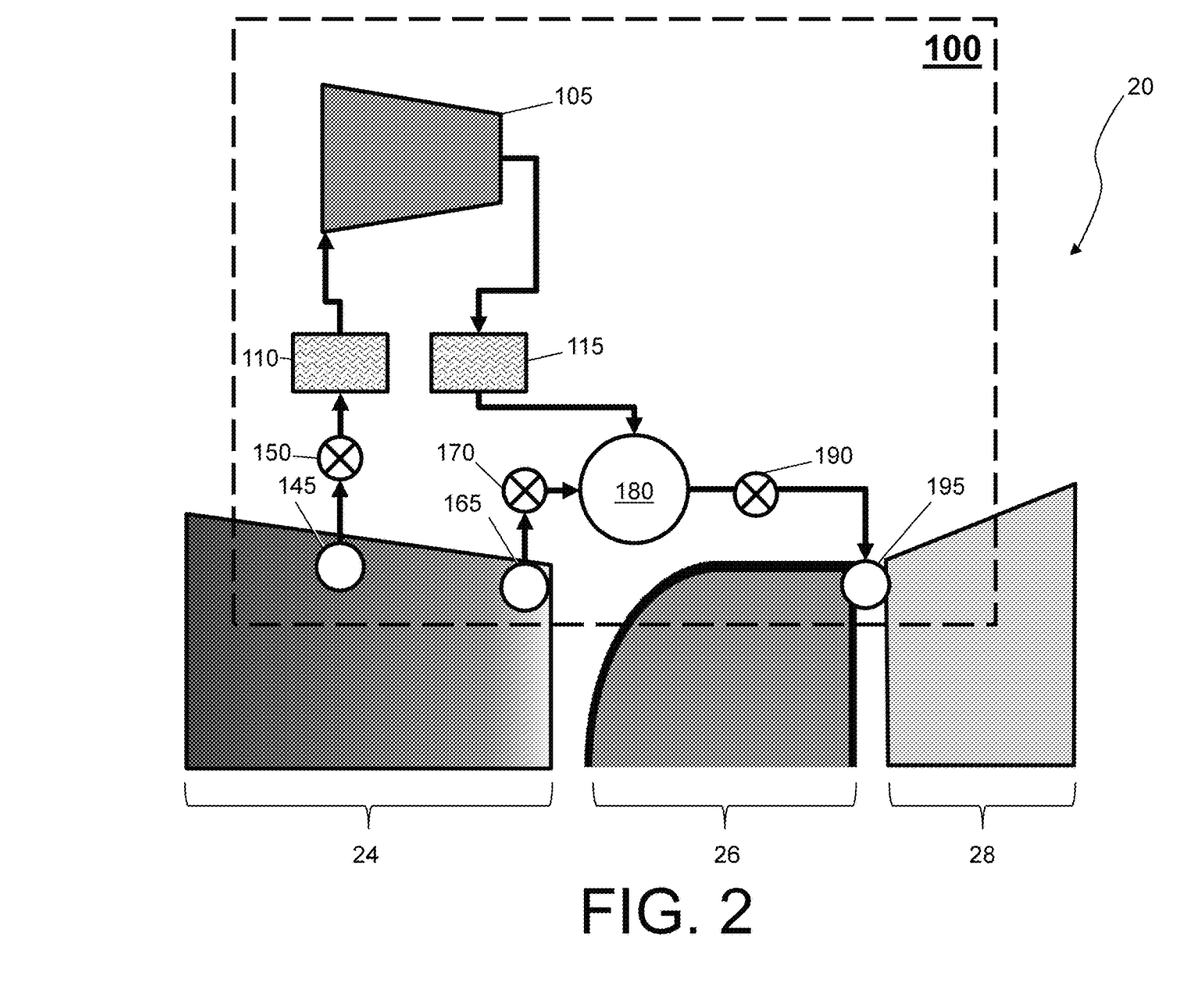
FIG. 2 is an intercooled cooling air system in accordance with an embodiment.

Turning now to FIG. 2, an intercooled cooling air system 100 (which can be also referred to as an intercooled cooling air system) is provided in accordance with an embodiment. In general, the intercooled cooling air system 100 comprises a staged cooling arrangement. The stages cooling arrangement can comprise one or more heat exchangers for each stage. In operation, bleed air from a first compressor is put through a first stage of the staged cooling arrangement (e.g., a first heat exchanger or set of heat exchangers). The flow is collected and run through a second compressor to pump it up. The discharge of the second compressor is then run through a second stage of the staged cooling arrangement (e.g., a second heat exchanger or set of heat exchangers) before being delivered as intercooled cooling air.

The intercooled cooling air system 100 is in fluid communication with bleed air of a gas turbine engine 20, which is illustrated schematically in FIG. 2. A non-limiting gas turbine engine 20 is described and illustrated in FIG. 1. Components of the gas turbine engine 20 that are similar to the gas turbine engine 20 of FIG. 1 have been reused for ease of explanation, by using the same identifiers, and are not re-introduced. As shown in FIG. 2, components of the environmental control system 100 comprise a pump 105 and at least one heat exchanger as the staged cooling arrangement. In one non-limiting embodiment, the at least one heat exchanger may comprise a first heat exchanger 110 (a first cooling stage) and a second heat exchanger 115 (a second cooling stage). Components of the environmental control system 100 may also comprise a first port 145, a valve 150, a second port 165, a valve 170, a demarcation 180, a valve 190, and a port 195.

As shown in FIG. 2, the pump 105, the first heat exchanger 110, and the second heat exchanger 115 are in fluid communication with bleed air of the gas turbine engine 20. Bleed air (e.g., a first bleed air flow) can be extracted from a first port 145 of the compressor section 24 of the gas turbine engine 20, as regulated by a valve 150. Bleed air (e.g., a second bleed air flow) can also be extracted from a second port 165 of the compressor section 24 of the gas turbine engine 20, as regulated by a valve 170. These portions can be mixed, as noted by demarcation 180, before being sent through a valve 190 to a third port 195 of the turbine section 28 of the gas turbine engine 20.

A heat exchanger (e.g., the first heat exchanger 110 and a second heat exchanger 115) is a device built for efficient heat transfer from one medium to another. Examples of heat exchangers include circular, double pipe, shell and tube, plate, plate and shell, adiabatic wheel, plate fin, pillow plate, and fluid heat exchangers.

The pump 105 (along with the compressor section 24) is a mechanical device built to raise a pressure of a medium. The compressor section 24, particularly, receives a medium (e.g., fresh atmospheric air) that flows through the compressor, which brings the medium to higher pressure. The pump 105 can raise the pressure of air bled from the compressor section 24. Examples of pumps and compressors include turbines, impellers, centrifugal compressors, diagonal or mixed-flow compressors, axial-flow impellers, reciprocating devices, ionic liquid piston devices, rotary screw compressors, rotary vane compressors, scroll compressors, diaphragm compressors, air bubble compressors, etc. Further, the pump 105 can be driven by a motor or a medium. In a non-limiting embodiment, the pump 105 can be an impeller.

The combustor section 26 can comprise a diffuser and a combustor to enable combustion of the medium. The combustor is a component or area of the gas turbine engine 20 where combustion takes place. Combustion comprises when energy is added to a medium received from the compressor section 24, which is at the higher pressure, by spraying fuel into the medium and igniting the fuel (so the combustion generates a high-temperature flow of the medium). The diffuser is a component that slows the medium from the compressor section 24 (e.g., the high speed, highly compressed air) to a velocity optimal for combustion.

The turbine section 28 extracts energy from a medium flow. For example, the turbine of the turbine section 28 is a rotary mechanical device that expands a medium received from the diffuser and combustor of the combustor section 26 down to an exhaust pressure to produce thrust.

Bleed ports are apertures that allow for a medium to be bled from the compressor section 24 (i.e., a compressor stage of the gas turbine engine 20, upstream of the combustor section 26) and may be located anywhere along the compressor section 24 (e.g., anywhere along the low pressure compressor 44 and the high pressure compressor 52 of FIG. 1). A temperature, a humidity, and a pressure of a bleed medium, also referred to as bleed air, varies depending upon a compressor stage and a revolutions per minute of the gas turbine engine 20. In a non-limiting embodiment, a plurality of bleed ports are represented by the first port 145 and the second port 165. The first port 145 can be a low pressure bleed port that is located towards an intake side of the compressor (e.g., the low pressure compressor 44) of the compressor section 24, where the pressure of the air is at or near atmospheric pressure (e.g., low pressure location). The second port 165 can be a high pressure bleed port that is located towards an exhaust side of the compressor (e.g., the high pressure compressor 52) of the compressor section 24, where the pressure of the air is at or near combustion pressure (e.g., high pressure location). The first port 145 can also be located at a mid-compressor bleed location, where the pressure of the air is between atmospheric pressure and combustion pressure (e.g., mid-pressure location). In contrast to the first port 145 and the second port 165, the third port 195 is an aperture that allows for a medium to be supplied to the gas turbine engine 20. In a non-limiting embodiment, the third port 195 is shown as being located at or near an intake of the turbine section 28 (downstream of the combustor section 26).

The valves 150, 170, and 190 are devices that regulate, direct, and/or control a flow of a medium by opening, closing, or partially obstructing various passageways within the tubes, pipes, etc. of the intercooled cooling air system 100. Valves 150, 170, and 190 can be operated by actuators, such that flow rates of the medium in any portion of the intercooled cooling air system 100 can be regulated to a desired value. Examples of valves 150, 170, and 190 include a flow regulation device or a mass flow valve.

A mixing point is a location within the intercooled cooling air system 100 where multiple medium and/or multiple medium flows are combined. In a non-limiting embodiment, the demarcation 180 marks a mixing point between the first bleed air flow and the second bleed air flow.

The intercooled cooling air system 100 comprises improvements in providing cooling air from the compressor section 24 to the turbine section 28 in the gas turbine engine 20. Embodiments of these improvements include a cooling-pumping-cooling operation, pumping-cooling-cooling operation, and cooling-cooling-pumping operation. An example the cooling-pumping-cooling operation of the intercooled cooling air system 100 will now be described.

In the case where an operating temperature in the turbine section 26 the gas turbine engine 20 is at a high temperature (at or exceeding material limits), air can be bled from the first port 145 by the value 150, operated by an actuator, of the intercooled cooling air system 100. This air can be referred to as bleed air (e.g., a first bleed air flow). Further, air can be bled from the second port 165 by the value 170, operated by an actuator, of the intercooled cooling air system 100. This air can also be referred to as bleed air (e.g., a second bleed air flow). In the example cooling-pumping-cooling operation, the bleed air that is described as being extracted from the first port 145 at the low pressure portion of the compressor section 24 to produce low pressure bleed air, and the air that is extracted from the second port 145 at the high pressure portion of the compressor section 24 can be high pressure bleed air. Note that the pressure of the air is generally the same at an exhaust of the compressor section 24 and at an intake of the turbine section 28 because there is a minimal amount of pressure loss when going through the combustor section 26.

The low pressure bleed air from the first port 145 can be supplied to the staged cooling arrangement of the intercooled cooling air system 100. As shown in FIG. 2, the low pressure bleed air passes through the first heat exchanger 110, where it is cooled to produce cool low pressure bleed air (cooling). The cool low pressure bleed air is then supplied to the pump 105, which pressurizes the cool low pressure bleed air to produce cool high pressure bleed air (pumping). Next, the cool high pressure bleed air passes through the second heat exchanger 115, where it is further cooled to produce the cooled cool high pressure bleed air (cooling). The cooled cool high pressure bleed air from the staged cooling arrangement can then be mixed at the demarcation point 180 with the high pressure bleed air from the second port 165 to produce intercooled cooling air.

Note that the act of cooling by the first heat exchanger 110 can cause a pressure drop on the bleed air. In this way, the first heat exchanger 110 can be configured to offset a performance of the pump 105. Further, the pump 105 can be configured to pressurize the air to at, slightly above, or considerably above the pressure at the exhaust of the compressor section 24 to compensate for an original low pressure at the first port 145 and/or for the pressure drop across the staged cooling arrangement. Furthermore, the second heat exchanger can be configured to cool the air exhausted from the pump 105 back down.

Figure 3:
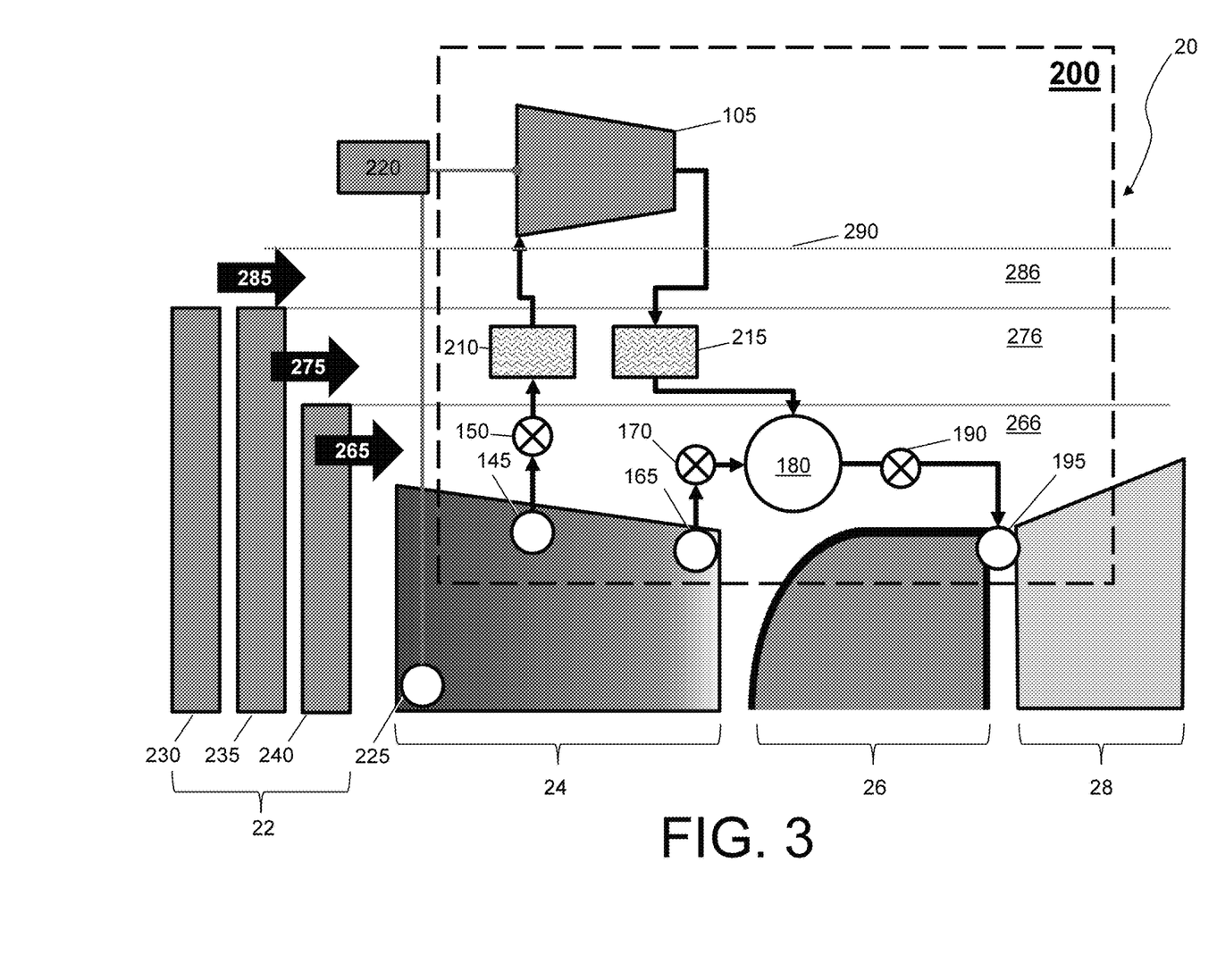
FIG. 3 is an intercooled cooling air system comprising heat exchangers in a stream in accordance with another embodiment.

FIG. 3 is an intercooled cooling air system 200 in accordance with another embodiment. In general, the intercooled cooling air system 200 comprises a staged cooling arrangement located in a bypass duct of the gas turbine engine 20. Components of the intercooled cooling air system 100 and the gas turbine engine 20 that are similar to the intercooled cooling air system 200 have been reused for ease of explanation, by using the same identifiers, and are not re-introduced. Components of the environmental control system 200 comprise a first heat exchanger 210, a second heat exchanger 215, a gearbox 220, a bleed port 225, and a fan section 22 comprising a plurality of fans. In a non-limiting embodiment, the fan section 22 comprises a first fan 230, a second fan 235, and a third fan 240. Components of the environmental control system 200 also comprise one or more bypass streams encased by bypass ducts. In an embodiment and as shown in FIG. 3, a main bypass stream 265 and a secondary bypass stream 275 are isolated within first and second bypass ducts of the gas turbine engine 20. A third bypass stream 285 can be located in a third bypass duct external to the second bypass duct, but within a casing 290 of the gas turbine engine 20 (e.g., located in an outer bypass duct that bypasses the fan section 22).

As shown in FIG. 3, the first heat exchanger 210 and the second heat exchanger 215 are aligned in the secondary bypass stream 275 to enable the stream to act as the heat sink for the blead air flow from the first port 145. Within the secondary bypass stream 275, the first heat exchanger 210 is upstream of the second heat exchanger 215. Alternative embodiments include collectively aligning the first heat exchanger 210 and the second heat exchanger 215 in the main bypass stream 265 and collectively aligning the first heat exchanger 210 and the second heat exchanger 215 in the third bypass stream 285. Alternative embodiments also include separately aligning the first heat exchanger 210 and the second heat exchanger 215 in different streams 275, 285, and 295. Further, embodiments can include utilizing one or more sources for a heat sink, such as bleed air, fluid cooling, air cycle machine cooling, etc., in lieu of or in addition to the streams described herein.

Also, as shown in FIG. 3, the gear box 220 can be fluidly coupled to bleed port 225. The gear box 220 can, in turn, be power by extracted from bleed air sourced from the bleed port 225 to drive the pump 105 (e.g., cause the pump to compress bleed air received from the first heat exchanger 210). In another non-limiting embodiment, the gear box 220 can be representative of an electric motor that powers the pump 105.

Figure 4:
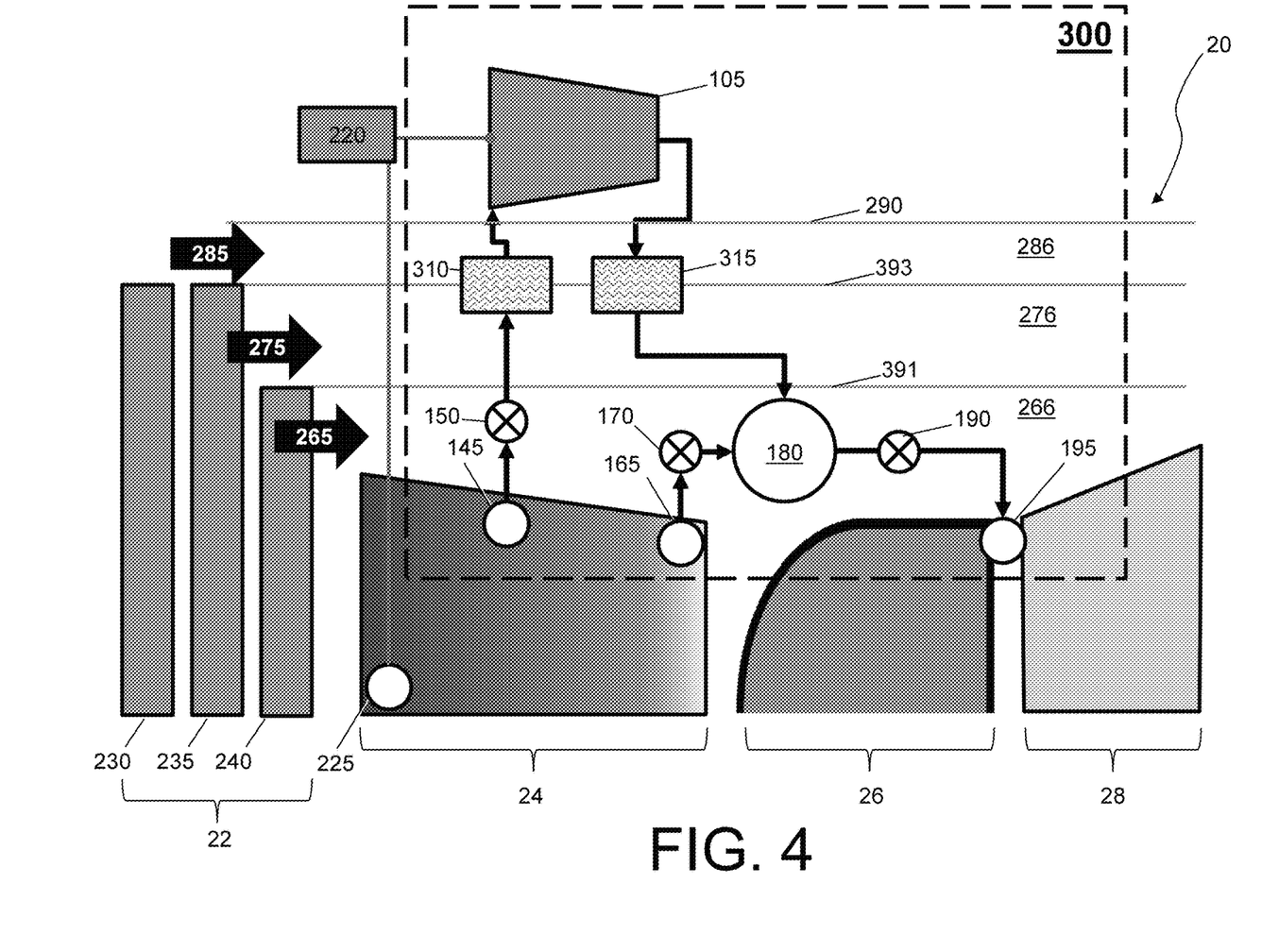
FIG. 4 is an intercooled cooling air system comprising heat exchangers on a cross stream in accordance with an embodiment.

FIG. 4 is an intercooled cooling air system 300 in accordance with an embodiment. In general, the intercooled cooling air system 300 comprises a staged cooling arrangement located in the path of multiple streams. Components of the intercooled cooling air systems 100 and 200 and the gas turbine engine 20 that are similar to the intercooled cooling air system 300 have been reused for ease of explanation, by using the same identifiers, and are not re-introduced. Components of the environmental control system 300 comprise a first heat exchanger 310, a second heat exchanger 315, a first duct wall 391, and a second duct wall 393. Note that each of the duct walls 391, 393 are the shells of the bypass ducts that encase the streams (provide a container or tunnel through with streams can flow).

As shown in FIG. 4, the first heat exchanger 310 and the second heat exchanger 315 are aligned on the second duct wall 393 to enable a plurality of streams (e.g., a combination of the secondary bypass stream 275 and the third bypass stream 285) to act as the heat sink for the blead air flow from the first port 145. Alternative embodiments include collectively aligning the first heat exchanger 310 and the second heat exchanger 315 on the first duct wall 393 and separately aligning the first heat exchanger 310 and the second heat exchanger 315 on different duct walls. Further, embodiments can include utilizing one or more sources for a heat sink, such as bleed air, fluid cooling, air cycle machine cooling, etc., in lieu of or in addition to the streams described herein.

Technical effect and benefits of an intercooled cooling air system include allowing for smaller total heat exchanger volume then a single stage of heat exchanger (s) by optimizing heat exchanger effectiveness and allowing more pressure to be taken. Technical effect and benefits of an intercooled cooling air system also include allowing for system flexibility in that a set of heat exchanger can be aligned to other system requirements and made to be dual use heat exchanger, allowing for system flexibility in that two sinks can be utilized, and allowing for more cooling than could be practically achieved with a one stage system.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A method of providing cooling air to a gas turbine engine, the method comprising:
    cooling a bleed air flow in a first cooling stage to produce a cooled bleed air flow, the bleed air flow provided from a bleed port of a compressor of a compressor section of the gas turbine engine;
    passing the cooled bleed air flow from the first cooling stage to a pump;
    increasing a pressure of the cooled bleed air flow in the pump to produce a pressurized cooled bleed air flow;
    receiving the pressurized cooled bleed air flow from the pump in a second cooling stage;
    cooling the pressurized cooled bleed air flow in the second cooling stage to produce an intercooled cooling air, wherein the first cooling stage and the second cooling stage are arranged with one another to define a series relationship;
    mixing the intercooled cooling air from the second cooling stage with another source of bleed air to provide the cooling air; and
    providing the cooling air to a port located downstream of a combustor section of the gas turbine engine and located at an intake of a turbine section of the gas turbine engine, wherein a first duct wall is configured to isolate a main bypass stream from a secondary bypass stream between a compressor section and a turbine section of the gas turbine engine, and a second duct wall is configured to isolate the secondary bypass stream from a third bypass stream between the compressor section and the turbine section of the gas turbine engine, wherein the third bypass stream is defined between the second duct wall and a casing of the gas turbine engine, the first and second duct walls extend from the compressor section to the turbine section, and the first cooling stage and the second cooling stage are in fluid communication with an air stream of the secondary bypass stream to perform the cooling.

2. An assembly for a gas turbine engine, the assembly comprising:
    a casing;
    a compressor section comprising a compressor;
    a turbine section;
    a first duct wall configured to isolate a main bypass stream from a secondary bypass stream between the compressor section and the turbine section;
    a second duct wall configured to isolate the secondary bypass stream from a third bypass stream between the compressor section and the turbine section, wherein the third bypass stream is defined between the second duct wall and the casing, and the first and second duct walls extend from the compressor section to the turbine section;
    a plurality of cooling stages in fluid communication with an air stream of the secondary bypass stream utilized by the plurality of cooling stages for cooling,
    wherein a first cooling stage of the plurality of cooling stages is fluidly coupled to a bleed port of the compressor to receive bleed air and cool the bleed air with the air stream to produce a cool bleed air; and
    a pump fluidly coupled to the first cooling stage to receive the cool bleed air and increase a pressure of the cool bleed air to produce a pressurized cool bleed air,
    wherein a second cooling stage of the plurality of cooling stages is fluidly coupled to the pump to receive the pressurized cool bleed air and cool the pressurized cool bleed air to produce an intercooled cooling air, the first cooling stage and the second cooling stage being arranged with one another in a series relationship, and
    wherein the second cooling stage provides the intercooled cooling air to a port located at an intake of the turbine section.

3. The assembly of claim 2, wherein the bleed port comprises a port at a low pressure location of the compressor.

4. The assembly of claim 2, wherein the bleed port comprises a port at a mid-pressure location of the compressor.

5. The assembly of claim 2, wherein the cooling by the first cooling stage offsets the pressurizing by the pump.

6. The assembly of claim 2, wherein the pressurized cool bleed air has a pressure greater than a pressure of the cool bleed air.

7. The assembly of claim 2, wherein the intercooled cooling air produced by the second cooling stage is mixed with a second bleed air sourced from a second bleed port of the compressor.

8. The assembly of claim 7, wherein the second bleed port comprises a port at a high pressure location of the compressor.

9. The assembly of claim 7, wherein the intercooled cooling air and the second bleed air are mixed upstream of the turbine section.

10. The assembly of claim 2, wherein the plurality of cooling stages is upstream of the combustor section.

11. The assembly of claim 2, wherein the plurality of cooling stages is aligned on the second duct wall.

12. The assembly of claim 2, wherein the pump is configured to be powered by a gearbox utilizing a second bleed air from the compressor.

13. The assembly of claim 2, wherein the first cooling stage and the second cooling stage of the plurality of cooling stages are in a cross stream configuration such that the first cooling stage and the second cooling stage are both within the secondary bypass stream and the third bypass stream of the gas turbine engine to permit a combination of the secondary bypass stream and the third bypass stream to act as a heat sink for the bleed air from the bleed port.

14. A gas turbine engine, comprising:
    a compressor section;
    a combustor section;
    a turbine section; and
    an intercooled cooling system comprising:

a first duct wall configured to isolate a main bypass stream from a secondary bypass stream between the compressor section and the turbine section of the gas turbine engine;

a second duct wall configured to isolate the secondary bypass stream from a third bypass stream between the compressor section and the turbine section of the gas turbine engine, wherein the third bypass stream is defined between the second duct wall and a casing of the gas turbine engine, and the first and second duct walls extend from the compressor section to the turbine section;

a plurality of cooling stages in fluid communication with an air stream of the secondary bypass stream utilized by the plurality of cooling stages for cooling, wherein a first cooling stage of the plurality of cooling stages is fluidly coupled to a bleed port of a compressor of the compressor section to receive bleed air and cool the bleed air with the air stream to produce a cool bleed air; and a pump fluidly coupled to the first cooling stage to receive the cool bleed air and increase a pressure of the cool bleed air to produce a pressurized cool bleed air, wherein a second cooling stage of the plurality of cooling stages is fluidly coupled to the pump to receive the pressurized cool bleed air and cool the pressurized cool bleed air to produce an intercooled cooling air, wherein the second cooling stage provides the intercooled cooling air to a port located downstream of the combustor section and located at an intake of the turbine section and wherein the first cooling stage and the second cooling stage are arranged with one another to define a series relationship.

15. The gas turbine engine of claim 14, wherein the pump is configured to be powered by a gearbox utilizing a second bleed air from the compressor.

16. The gas turbine engine of claim 14, wherein the first cooling stage and the second cooling stage of the plurality of cooling stages are in a cross stream configuration such that the first cooling stage and the second cooling stage are both within the secondary bypass stream and the third bypass stream of the gas turbine engine to permit a combination of the secondary bypass stream and the third bypass stream to act as a heat sink for the bleed air from the bleed port.

* * * * *